F. VON MARBOD.
COMBINED STOOL AND MILK PAIL.
APPLICATION FILED JAN. 26, 1917.
1,259,323.
Patented Mar. 12, 1918.
2 SHEETS—SHEET 2.
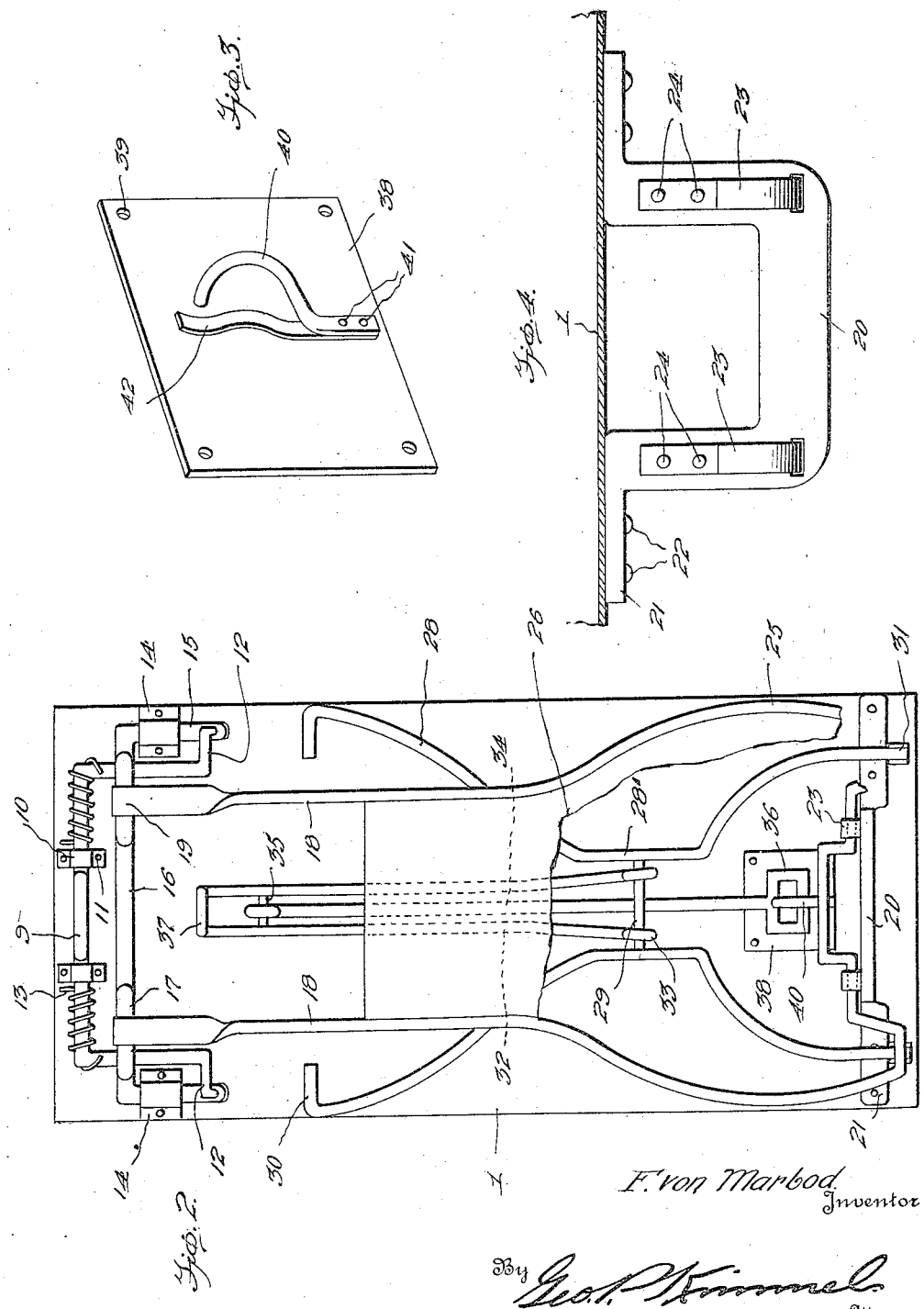

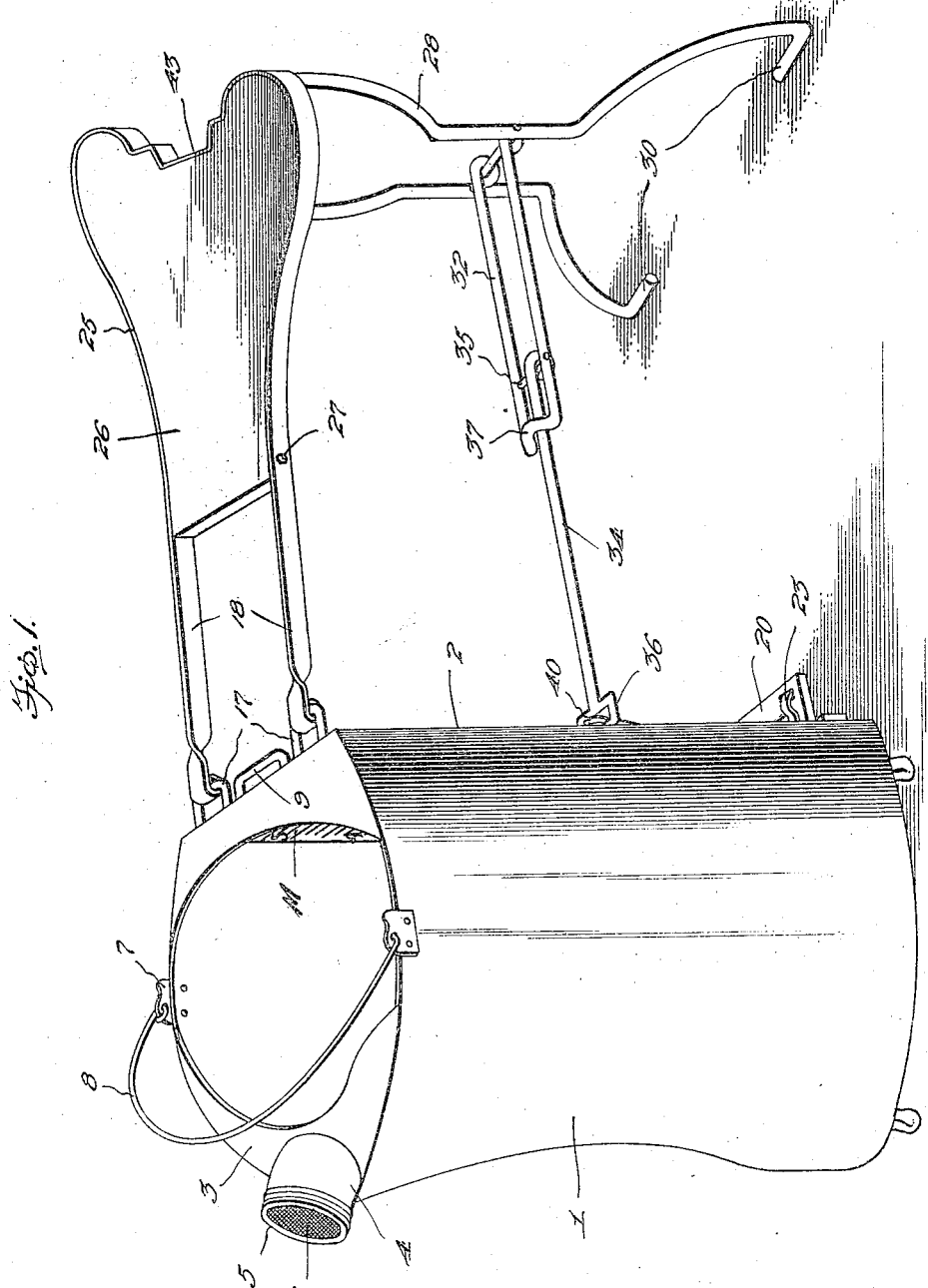

UNITED STATES PATENT OFFICE.

FRIEDRICH von MARBOD, OF ADDY, WASHINGTON.

COMBINED STOOL AND MILK-PAIL.

1,259,323.

Specification of Letters Patent.

Patented Mar. 12, 1918.

Application filed January 26, 1917. Serial No. 144,703.

*To all whom it may concern:*

Be it known that I, FRIEDRICH VON MARBOD, a subject of the Emperor of Austria, and resident of Addy, in the county of Stevens and State of Washington, have invented certain new and useful Improvements in Combined Stools and Milk-Pails, of which the following is a specification.

This invention relates to supports, and has more especial reference to an improved combined stool and milk pail.

The invention has for its principal object to provide a combined stool and milk pail, the stool portion of which may be readily folded along the side of the pail, thereby, permitting the device to be readily carried when the pail is filled.

Another object of the invention is to provide a combined stool and milk pail, the pail serving as a supporting leg for one end of the stool when the same is moved into set up position.

A further object of the invention is to provide a stool which can be removed from the pail when necessary and the pail then used for various purposes, but, when engaged with the pail will be securely locked in position.

Another important feature of the invention resides in the provision of straining means, which straining means are arranged over the discharge portion of the pail and will efficiently strain the milk during the pouring of the same from the pail.

The improvements in the details and arrangements of parts will be apparent from an inspection of the accompanying drawings, in connection with the specific description hereinafter contained, and wherein the preferred embodiment of the invention is disclosed for the purpose of imparting a full understanding of the invention.

In the drawings:

Figure 1 is a perspective of my combined stool and milk pail in set up position;

Fig. 2 is a bottom plan of the same when folded;

Fig. 3 is a detail in perspective of one of the securing strips; and

Fig. 4 is a detail in top plan of the pail handle together with the securing strips as arranged thereon.

Referring now more particularly to the drawings, wherein like reference characters designate corresponding parts throughout the several views, there is provided a milk pail, indicated in its entirety by the numeral 1, one side portion of which is flattened as at 2 and has arranged upon the inner face a scale M, while the upper portion thereof is provided with a deflecting lip 3, the said lip being apertured and having a discharge spout 4 ensuing therefrom. The outer end of the said discharge spout 4 is screw threaded and receives thereover a complementally threaded coupling member 5, the coupling member in turn serving as means for clamping a screen or other form of strainer 6 over the mouth of the said discharge spout 4. Suitable ears 7 are secured to the opposite sides of the pail 1 and have pivotally engaged therewith a bail 8 for an obvious purpose.

Upon the flattened portion 2 of the pail 1, there is secured, in proximity of the upper portion thereof, a crank handle 9, the said handle being pivotally supported within bearings 10 secured to the pail 1 by means of rivets 11 or the like. The opposite extremities of the said crank handles 9 are bent downwardly at substantially right-angles to the body portion thereof and are in turn, provided with right-angularly disposed end portions 12, the purpose of which will be presently apparent. About the upper portions of the bearings of the said crank handle 9, there is arranged a plurality of coiled springs 13, certain of the ends of which are secured to the adjacent portions of the pail or the bearings 10 while the remaining ends thereof are engaged with the adjacent portions of said crank handle 9. By so arranging the coiled springs 13 about the bearing portions of the crank handle 9, it will be appreciated, that the same will be normally maintained in a position at substantially right-angles to the pail 1, but, when desired, may be rocked upwardly by reason of its mounting within the bearings 10, against the tension of the coiled springs 13. When released, however, the handle will immediately assume its normal position, that is, at right angles to the pail 1, by reason of the spring 13. Directly below the crank handle 9 are oppositely disposed bearings 14, which bearings receive therein depending leg portions 15 of a bar 16, the bar being offset intermediate its ends as at 17 in order that pivotal connection may be had with the supporting arm 18 as at 19. The lower extremities of the depending leg portions 15 are curved outwardly and when fully seated within the bearings 14 are engaged by the right-angularly disposed extensions 12 of the crank handle 9. Thus, it is evident, that when the said leg portions 15 are engaged by the extensions 12, the bars 16 will be securely locked in position within the bearings 14 upon the pail. However, by disengaging the said extensions 12 from the curved portions of the depending legs 15, the bars 16 may be readily withdrawn from engagement with the bearings 14, thereby, permitting the detaching of the stool, the construction of which will be more fully hereinafter set forth.

A second handle 20 having off set portions 21 thereon is secured to the flattened portion 2 of the pail 1 through the medium of rivets 22 or other similar fastening devices which are passed through the said off-set portions 21 into engagement with the pail. A plurality of spring clips 23 are secured to the upper face of the handle 20 as at 24, the purpose of which will be hereinafter more fully set forth.

As will be noted, the seat supporting arms 18 are formed upon a substantially U-shaped frame 25, a portion of which frame receives therebetween a seat 26, the seat being secured in position by means of suitable fastening devices 27 which are passed through the sides of the frame into engagement therewith.

It will be understood, that by reason of the pivotal engagement of the supporting arms 18 with the off set portions 17 of the bars 16, that one end of the seat 26 will be sufficiently supported. Therefore, with a view toward providing means for supporting the remaining end of the seat 26, when the same is moved to set up position, I secure to the outer or free ends thereof and upon the under face of the same a supporting leg 28, the leg being formed of a plurality of metal rods, which rods are off set intermediate their ends as at 28 and are connected by a cross bar 29, while the free ends of the same are provided with inturned seats 30. Those ends of the rods as adjacent the free end of the seat 26 are secured thereto through the medium of hinges 31. Thus, when the seat 26 is folded into inoperative positions, the supporting leg 28 may be readily swung upon its pivot point into position substantially parallel with the said seat. To brace the leg 28 when the same is moved into set up or operative position, whereby, to prevent collapsing of the same, a bracing element including a U-shaped secton 32 having the free ends thereof pivotally secured to the cross member 29 as at 33 and a parallel disposed rod 34 having one of the ends thereof pivotally secured to a cross pin 35 as carried by the section 32 and the remaining end looped as at 36 is provided. In order that the rod 34 may be properly received by the section 32, the base portion of the same is bent upwardly or off set as at 37 and obviously, receives a portion of the said rod 34 therein, thus, bracing the same in its unfolded position. A plate 38 is secured to the flattened portion 2 of the pail 1 by passing suitable fastening devices through apertures 39 as formed therein and is arranged at a point in proximity of the bottom or lower end of the pail. A curved guide arm 40 is secured to the said plate as at 41 and has arranged therebeneath an arcuate spring 42, which spring is adapted to have slidably engaged therewith the looped portion 36 of the rod. Thus, when the said loop portion of the rod 34 is engaged with the arcuate spring 42, the same will be caused to seat within the arm 40 and will thereby, be properly supported in unfolded or set up position.

The outer end of the seat 26 is recessed as at 43 and as a consequence, when the said seat is moved into its folded or inoperative position, the marginal edges thereof will be engaged by the spring clips 23 and will be maintained in engagement therewith until it is desired to again move the seat into set up position.

From the foregoing, it will be appreciated by workers in the art, that I have provided an exceedingly simple and efficient device, and one which may be readily carried from place to place, as is necessary in constructions of this character. Should it be desired to use the pail 1 independently of the stool attachment, the said stool attachment may be readily removed therefrom by disengaging the extensions 12 of the crank handle 9 from the curved portion of the depending legs 15, whereupon the bars 16 may be removed from the bearings 14 and the looped portion 36 of the leg brace disengaged from its respective arm 40. When in set up position, the pail 1, in combination with the supporting leg 28 will serve as means for efficiently supporting the seat in its set up position.

The strainer 6 which is arranged over the discharge portion of the spout 4 also offers novel matter, since, it is obvious, that the milk will be strained and that all foreign matter will be removed therefrom during the pouring of the same into the receiving receptacle.

While I have herein illustrated and described with a considerable degree of particularity, constructional details of the device embodying my invention, it is to be understood that the invention is not limited to the particular form and arrangements of the several parts which may be modified within a wide range without departing from the essence of the invention, the construction shown and the description based thereon being intended to be taken in an illustrative rather than a limiting sense.

I claim:

1. In a combined milking pail and stool, a pivotal seat removably engaged with said pail, a handle slidably arranged on said pail and provided with means engageable with the seat for locking the same in engagement with the pail, and a foldable leg arranged on the free end of the seat.

2. In a combined milking pail and stool, a pivotal seat removably engaged with said pail, means for locking said seat in engagement with the pail, a foldable leg on the free end of the seat, and a foldable brace pivotally engaged with said leg and removably engaged with the pail.

3. In a combined milking stool and pail, a pivotal seat removably engaged with said container, a handle slidably mounted on said container and provided with means engageable with said seat for locking the same in engagement with the container, a foldable leg mounted on the free end of the seat, and a foldable brace having one end thereof pivotally engaged with said leg and the remaining end removably engaged with the container.

4. In a combined milking pail and stool, a pivotal seat removably engaged with said pail, a handle slidably mounted on the pail and provided with means engageable with the seat for locking the same in engagement with said pail, a foldable leg mounted upon the free end of the seat, a foldable brace having one end thereof pivotally engaged with said leg and the remaining end removably engaged with the pail, and means on the container and engageable with said seat for retaining the same in folded position.

5. In a combined milking pail and stool, a pivotal seat detachably engaged with the pail, a spring pressed handle pivoted to one side of the pail and engageable with the pivotal connection of said seat for securing the same in engagement therewith, a foldable leg arranged upon the free end of the seat, and means on the pail engageable with said seat for retaining in folded position.

In testimony whereof, I affix my signature hereto.

FRIEDRICH von MARBOD.

Copies of this patent may be obtained for five cents each, by addressing the "Commissioner of Patents, Washington, D. C."